Oct. 24, 1939.  O. A. ROSS  2,177,152
MOTION PICTURE FILM REEL
Filed July 13, 1936   2 Sheets-Sheet 1
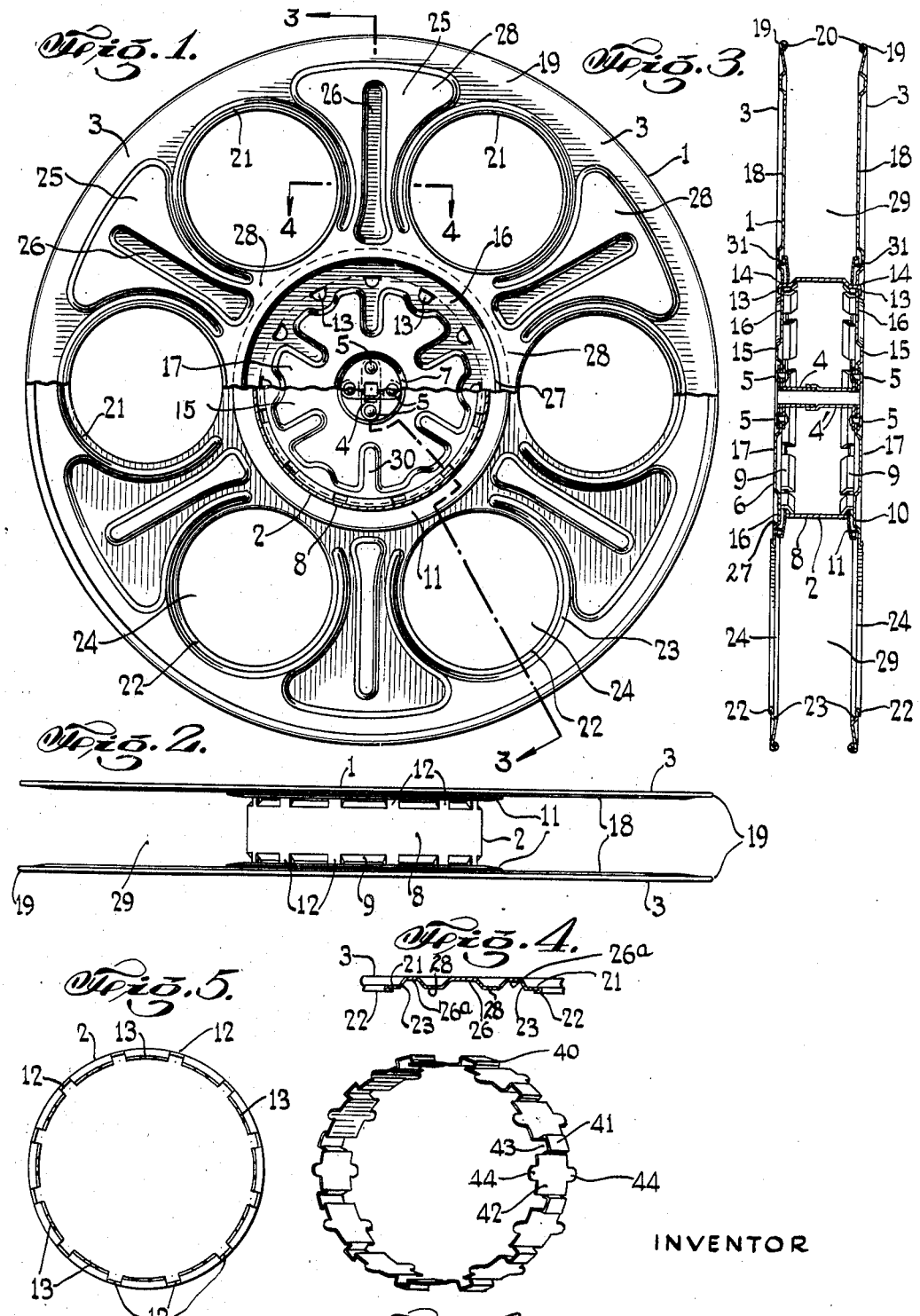
INVENTOR
Oscar A. Ross Oct. 24, 1939.  O. A. ROSS  2,177,152

MOTION PICTURE FILM REEL

Filed July 13, 1936  2 Sheets-Sheet 2

INVENTOR

Oscar A. Ross.

Patented Oct. 24, 1939

2,177,152

UNITED STATES PATENT OFFICE 2,177,152

MOTION PICTURE FILM REEL

Oscar A. Ross, New York, N. Y.

Application July 13, 1936, Serial No. 90,341

13 Claims. (Cl. 242—74)

This invention relates to motion picture film reels and more particularly to that form used by motion picture film exchanges for shipment of release print to exhibitors.

At present much time and film is lost when winding and unwinding as the reel must be stopped and the end of the film inserted at a fixed point usually in a slot or under a projection on the hub, both of which cause tearing of the film when unwinding, in the case of the slot the torn ends filling the hub thereby causing a fire hazard as well as adding to the weight of the reel. This invention comprehends overcoming these difficulties by permitting the starting of a film onto a reel during the rotation thereof and also permitting the unwinding to be effected without tearing the end of the film even though the reel may be in motion.

The invention further comprehends a novel clamping arrangement for films whereby the ends of the film are not deformed by transverse bends which occur when said films are inserted in a slot when starting the film onto the reel, the novel film clamping arrangement being effected to clamp the film on the edges thereof and also automatically resiliently clamp said film edges while the reel is in motion.

The invention further comprehends novelly formed hubs for motion picture reels peculiarly reinforced for producing a more rigid reel structure.

The invention further comprehends peculiarly formed flanges for motion picture reels having peculiar forms of reinforcement combined with flexible portions whereby the flanges may be resiliently deflected to a certain extent but will resist deformation thereof.

The invention further comprehends novelly formed and peculiar spindle structure and support thereof by the reel flanges for producing a rigid and non-readily breakable structure to this important part of a reel and thereby prolonging its life.

Other advantages will be apparent as the description of the invention progresses and the novel and peculiar features thereof will be pointed out in the specification and claims, it being understood that minor changes may be made without departing from the spirit of the invention.

Figure 9:
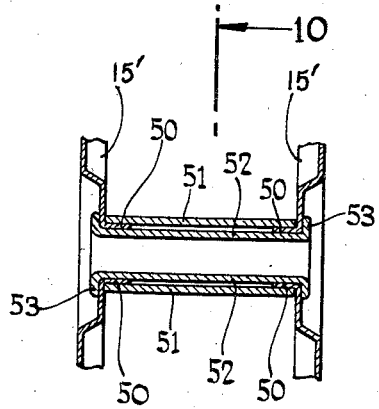
Figure 8:
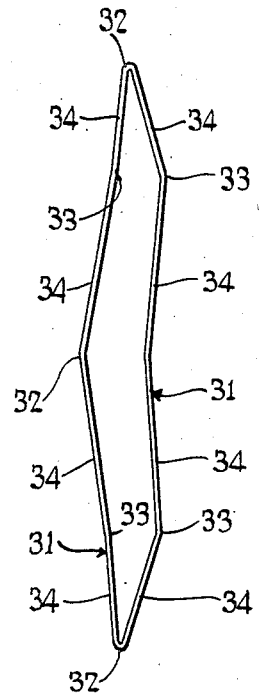
Figure 7:
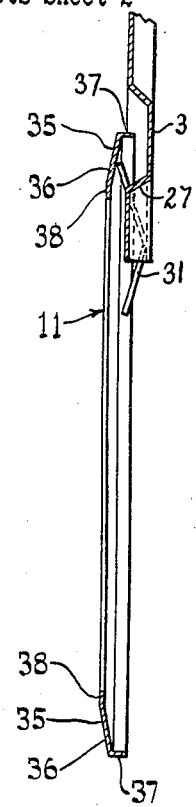
Figure 10:
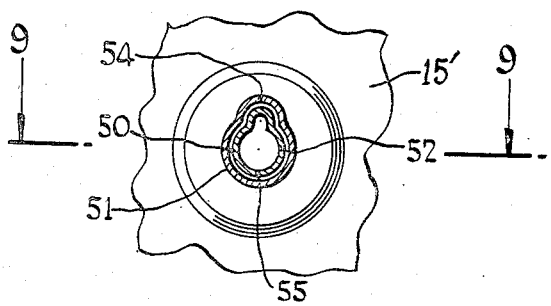

Referring to the drawings wherein like reference characters refer to corresponding parts: Figure 1 is a part broken plan view of one embodiment of the invention showing the exterior and interior formation thereof, and Fig. 2 is an elevational view of the same, and Fig. 3 is a sectional view of the same taken on line 3—3 of Fig. 1, and Fig. 4 is a sectional view taken on line 4—4 of Fig. 1, and Fig. 5 is a detailed end view of one form of hub for motion picture reels, and Fig. 6 is a perspective view of a modified form of hub, and Fig. 7 is an enlarged detailed view of the film clamp member and mounting thereof and Fig. 8 is an enlarged perspective view of the film clamping member springs, and Fig. 9 is a sectional view of a modified form of spindle structure, and Fig. 10 is a sectional view of the same taken on line 10—10 of Fig. 9.

Referring to Figs. 1, 2, 3, 4, 5, 7 and 8, reel 1 comprises an assembly of hub 2 and flange members 3—3, each flange having a half spindle member 4 secured thereto by rivets or welds 5—5, a reinforcing washer 6 in recess 7 of said flanges, acting to rigidify the juncture of said spindle member with said flange members. Spindle members 4 are more fully described in my Patent No. 1,840,822 granted January 12, 1932.

Hub 2 comprises film bearing or intermediate portion 8 and flange abutting or end portions 9 of lesser diameter than said film bearing portion 8, thereby forming annular grooves 10 for receiving film clamping members 11.

Stops or extensions 12 formed from the body of hub 2 and extending in the same cylindrical plane as the intermediate portion 8, act to limit the inward travel of film clamping members 11 which normally impinge thereagainst through the action of resilient members or springs 31, said springs being positioned between said film clamping members and flange members 3, the bevel reinforcing portion 27 acting to allocate said resilient member cylindrically with respect to the axis of the reel, thereby also acting to maintain said film clamping members cylindrically with respect to the axis of said reel whereby the inner portion 38 of said clamping members is normally positioned spacedly from the flange abutting portion 9 of hub 2.

Also formed in hub 2 are ears or lugs 13 extending through opening 14 in flange members 3, the outward portion of said lugs being bent radially downwardly over the outer surface of said flanges for locking hub 2 thereto.

Flange members 3 comprise central, or hub supporting portions 15 having central recesses 7 of sufficient depth to prevent the heads of rivet 5 from protruding thereabove. Said central portion also includes inwardly recessed annular hub attaching portion 16, also of sufficient depth to prevent the bent lugs 13 from projecting above the exposed wall portions 17 and 28. Also formed in central portion 15 are radially disposed reinforcing depressions 30 arranged in substantially the same plane as the depressed annulus 16. The annulus 16 provides a protection of bent lugs 13 when reels are removed or replaced in shipping cases and also serves to form a resilient portion whereby the flanges may be resiliently deflected.

Flange members 3 also comprise a flange or film supporting portion 18 extending beyond said central or hub supporting portion 15, said film supporting portion having rolled over flange edge portion 19 in which is preferably rolled a reinforcing or spring steel wire 20. Also formed in said film supporting portion 18 are annular reinforced portions 21 stamped from the body of said flange portion having crimped over flange portions 22 joined thereto (see Fig. 4). Also formed in said film supporting portions 18 are reinforcing grooves 26a joined to annular portions 21 by frusto conical portions 23 further acting to reinforce said film supporting portion, the forming of annular portions 21 producing perforations or opening 24. Between each of the annular reinforcing grooves 26a is formed a radial reinforcing groove 26 acting to further reinforce film supporting portion 18, said grooves 26 being stopped short of the recessed annulus 16 thereby forming a continuous frusto-conical reinforcing portion 27 extending between said hub supporting portion 15 and film supporting portion 18, being joined between the outer wall portion 28 and annulus 16. This combination of structure produces resiliency in annulus 16 which permits the flange portions 18 being sprung or moved relatively without deforming the structure thereof.

It is to be noted that the depressed reinforcing portions 26 and 30 form an interrupted radial reinforcement.

Film clamping member 11 (Fig. 7) comprises bevelled film clamping portion 35 having film clamping face 36 and peripheral flange portion 37 acting to reinforce said member, also annular allocating portion 38 abutting stops or extensions 12.

Resilient member 31 (Fig. 8) comprises hump portion 32 arranged to engage said film clamping members and allocating hump 33 arranged to engage frusto-conical portion 27 said hump portions being connected by resilient portion 34.

Referring to the modified form of hub 40 shown in Fig. 6 and preferably formed of strip material, combined film supporting and film clamping member abutting portions 41 extending transversely of said hub are of a lesser width than the flange supporting portions 42, the end portions 43 thereof acting as stops for film clamping members 11. It is to be noted the film supporting portions 41 are a greater distance radially from the axis of the hub than the flange supporting portions 42. Flange supporting portions 42 are provided with lugs or extensions 44 similar to lugs or extensions 13 of hub 2.

Referring to Figs. 9 and 10 showing a modified form of spindle structure, central portion 15' of flange members 3 are modified to include an inwardly extending annulus or flange 50. During assembly of the flange members and hub, an exterior sleeve 51 is inserted over said flange portion 50, thereafter the inner sleeve 52 is inserted through the opening of central portion 15', the end portions 53 of said inner sleeve being spun or stamped over against central portion 15' thereby clamping said flange between the ends of exterior sleeve 51 and spun over ends 53. It is to be understood that the ends 53 may be a continuous flange or a plurality of lugs. Exterior and interior sleeves 51 and 52 may be either cylindrical or rectangular in form depending on the type of spindle onto which the reel is to be mounted. Sleeves 51 and 52 are preferably formed of sheet metal stamped into the form shown, the abutting ends 54 and 55 being preferably welded together and disposed diametrically oppositely in assembly as shown.

When winding a film onto reel 1 the starting end is inserted between clamping members 11. The clamping members are preferably spaced whereby the edges of a standard 35 mm. film will engage substantially midway on the bevelled film clamping face 36 as said starting end is inserted therebetween. Rotation of the reel and tension on the film acts to move clamping members 11 away from the stops 12 as said film is drawn against the film supporting portion 8 of hub 2 and upon a complete revolution of said reel the starting end is also caused to engage said portion 8 the starting end of the film being normally edge clamped by the flat clamping portions 38, preferably only a few of the first layers being clamped between said clamping members. Continued rotation of the reel will wind the film into the film space 29, the innermost flange portions, as 26 and 26a serving to guide the film during the coiling thereof on said reel.

When said film is unwound from said reel, either during re-reeling, or exhibition, and as the last few turns are unwound, the clamping members 11 move toward each other under the action of springs 31 until said clamping members again engage the stops 12.

The film may be wound onto said reel during the rotation thereof by snapping or flapping the end thereof downwardly between the flange members 3 until said film end is frictionally engaged between said clamping members 11 thereby saving time in reeling.

When a hub as 40 is employed the winding of the film onto the reel acts to move said clamping members away from the stops or abutting surfaces 43, the film resting on the film supporting portions 41 solely, and as said film is unwound from said reel, said film clamping members, as 11 move toward and engage said stops 43.

It is to be understood that either hub 2 or 40 may be made from strip material and stamped into the forms as shown.

The resilient members 31 are preferably formed from spring steel wire being formed as shown.

It is to be noted that the outer flange portions 19 have an outward flare and this structure combined with the forming of the radial recesses 26 and 26a act to form a T shaped outwardly extending boss 25 between openings 24, said boss forming a portion of the exterior wall 28 of reel 1, this portion being formed in substantially the same plane as the exterior wall portion 17 of the central flange portion 15.

The joints or seams 54 and 55 of sleeve members 51 and 52 are preferably flash welded and diametrically oppositely positioned for forming a more rigid structure at the spindle opening portion of reel 1.

What I claim is:

1. In a motion picture film reel, a pair of flange members, a cylindrical hub having an intermediate film supporting portion, flange abutting portions at each end of said intermediate portion having a lesser diameter than the diameter of said intermediate portion, means for securing said flange members to the end of said flange abutting portions spacedly between the axis and periphery of said flanges whereby annular grooves are formed between said flange members and said intermediate hub portion, annular film clamping members having a portion thereof exterior of said grooves and another portion extending into said grooves, and means resiliently urging said members toward each other.

2. In a motion picture film reel, a pair of flange members, a cylindrical hub having an intermediate film supporting portion, flange abutting portions at each end of said intermediate portion having a lesser diameter than the diameter of said intermediate portion, means for securing said flange members to the end of said flange abutting portions spacedly between the axis and periphery of said flange members whereby annular grooves are formed between said flange members and said intermediate hub portion, annular film clamping members inwardly of said flange members having a film clamping portion exterior of said grooves and a stop portion extending into said grooves, stops on said hub engaging said members when no film is present on said reel, and means resiliently urging said members to engagement with said stops.

3. In a motion picture film reel, a pair of flange members, perforations in said flange members spacedly between the axis and the periphery thereof, a hub having an intermediate continuously cylindrical portion for supporting the film, annular flange supporting portions at each end of said intermediate portion having a diameter less than the diameter of said intermediate portion and spacing said flange members from said intermediate portion whereby annular recesses are formed between said intermediate portion and said flange members, and bendable extensions on said flange supporting portion extending through said perforations and bent against the exterior surface of said flange members for rigidly joining said hub thereto.

4. In a motion picture film reel, a pair of flange members, perforations in said flanges spacedly between the axis and the periphery thereof, a hub having an intermediate cylindrical portion for supporting the film, annular flange supporting portions at each end of said intermediate portion having a diameter less than the diameter of said intermediate portion whereby annular recesses are formed between said intermediate portion and said flanges, film clamping members surrounding said flange supporting portions for clampably engaging the edges of a film as it is wound onto said reel, and bendable extensions on said flange supporting portions arranged to enter said flange perforations and be bent relatively thereto for securing said flanges to said hub.

5. In a motion picture film reel, a pair of flange members, a hub having an intermediate continuously cylindrical portion for supporting the film thereon, cylindrical flange abutting portions at each end of said intermediate portion having a diameter less than the diameter of said intermediate portions, means on said flange abutting portions for securing said flange members to said hub spacedly from said intermediate portions for forming annular grooves between said flange members and said intermediate portion, and means supported in said annular grooves for engaging the edges of a film when wound on said reel.

6. In a motion picture film reel, a pair of flange members, a hub having an intermediate cylindrical portion for supporting the film, cylindrical flange attaching portions at each end of said intermediate portion having a diameter less than the diameter of said intermediate portion, means for securing said flange members to said film attaching portions spacedly between the axis and the periphery of said flanges whereby annular grooves are formed adjacent said flanges, annular film clamping members surrounding said flange attaching portions having a portion thereof extending into said grooves, and stop portions on said hub engaging said film clamping members formed in substantially the same cylindrical plane as said intermediate portion.

7. In a motion picture film reel, a pair of flange members each having an inwardly extending tubular portion forming a spindle opening therethrough, a cylindrical hub for supporting the film including means for securing said flange members at each end thereof, an exterior sleeve between said flange members extending over said tubular portions, a spindle sleeve within said exterior sleeve extending through the spindle opening of said tubular portion beyond said flange members, and bendable locking portions at each end of said spindle sleeve arranged to be bent outwardly for clamping said flange members therebetween and the ends of said exterior sleeve.

8. In a motion picture film reel, a pair of flange members each having an inwardly extending tubular flange portion forming a spindle sleeve opening therethrough, a cylindrical hub for supporting the film including means for securing said flange members at each end thereof, an exterior sleeve extending between said flange members surrounding said tubular flange portions, a spindle sleeve extending through said spindle sleeve openings beyond the outer ends thereof, and bendable locking portions on said outer ends of said spindle sleeve arranged to be bent outwardly for clamping said flanges therebetween and the ends of said exterior sleeve.

9. In a motion picture film reel, a pair of flange members, a hub having a plurality of circumferentially spaced flange abutting portions extending transversely thereof, a plurality of film supporting portions joined to and extending radially outwardly from said flange abutting portions in the spaces therebetween, said film supporting portions being inwardly spaced from the ends of said flange abutting portions, and means on the ends of said flange abutting portions for attaching said flanges to said hub spacedly from the ends of said film supporting portions.

10. In a motion picture film reel, a pair of flange members, a hub having an intermediate film supporting portion of cylindrical form, cylindrical flange abutting portions at each end of said intermediate portion said flange abutting portions being of a lesser diameter than said intermediate portion, means on said flange abutting portions for securing said flange members thereto spacedly from said supporting portion to form annular spaces between said flange members and said intermediate portion, and film clamping members positioned partly within and partly beyond said spaces for engaging the edges of a film when supported by said reel.

11. In a motion picture film reel, a pair of flange members, a hub having a cylindrical intermediate film supporting portion, cylindrical flange abutting portions at each end of said intermediate portion having a diameter less than the diameter of said intermediate portion, means on said flange attaching portions for securing said flange members to said hub spacedly from said intermediate portion to form annular spaces between said flange members and said intermediate portion, and means mounted in said annular spaces for resiliently engaging a film when supported by said reel.

12. In a motion picture film reel, a pair of flange members, an annular hub, means for securing said flange members in spaced relation to said hub, spindle sleeve openings in said flange members, an inner spindle sleeve extending between said flange members and through said openings, an exterior spindle sleeve surrounding said inner sleeve extending between said flange members having the ends thereof abutting the inner faces of said flange members, and means on the ends of said inner sleeve for clamping said flange members against the abutting ends of said exterior sleeve.

13. In a motion picture film reel, a pair of flange members, a hub having a plurality of circumferentially spaced flange supporting portions including means for securing said flange members to said hub, film supporting portions in said spaces circumferentially joining said flange supporting portions having a hub diameter greater than the hub diameter of said flange supporting portions, the ends of said film supporting portions being spaced from said flange members to form annular grooves therebetween, and film clamping members mounted in said grooves for edgewise engagement of a film when wound onto said reel.

OSCAR A. ROSS.